April 1, 1969 W. J. COLEN 3,436,115
ARTICLE HANDLING APPARATUS
Filed Dec. 4, 1967 Sheet 2 of 2

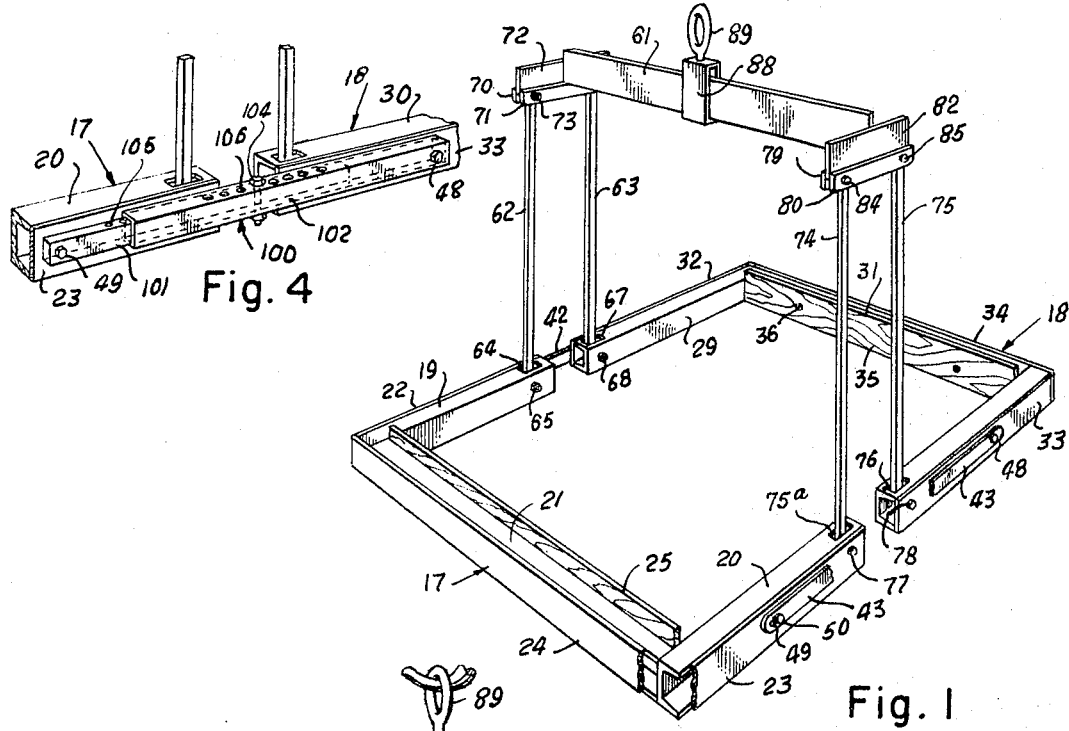

INVENTOR
William J. Colen
BY
ATTORNEYS

United States Patent Office 3,436,115
Patented Apr. 1, 1969

3,436,115
ARTICLE HANDLING APPARATUS
William J. Colen, 11248 Jamestown, Dallas, Tex. 75230
Filed Dec. 4, 1967, Ser. No. 687,621
Int. Cl. F66c 1/22; B65g 7/00
U.S. Cl. 294—87
19 Claims

ABSTRACT OF THE DISCLOSURE

A device for lifting articles, such as a stack of bricks, tile and the like, having a pair of U-shaped gripping members positionable about the stack of bricks, each having longitudinal parallel side members and a connector member extending perpendicularly between outer ends thereof, the adjacent side members being pivotally connected intermediate their ends by pivot and spacer bars which hold them against lateral displacement relative to one another and cause the gripping members to pivot upwardly about the axes of the pivotal connections of the side members with the pivot and spacer bars and the connector members of the two gripping members to exert upwardly and inwardly directed forces at opposite ends of the bottom layer of the bricks when an upward force is exerted on the inner ends of the side members.

---

This invention relates to an article handling device, and more particularly to an article handling apparatus for lifting a stack of articles such as bricks, tile and the like.

An object of this invention is to provide a new and improved article handling device for easily and quickly lifting a stack of bricks or the like off a supporting surface, such as a pallet upon an application of only an upward force to the device by a suitable hoist or the like.

Another object is to provide an article handling device wherein the compression forces to which articles to be lifted are subjected by the device vary in accordance with the weight of the load being lifted.

Still another object is to provide a holding device which engages only the articles in the opposite end rows of the bottom layer of the stack during their movement thereof and only the bottom layer of articles is subjected to compressional forces exerted by the device thus permitting the weight of the whole stack to be used to provide the force holding the bottom layer of bricks in place.

A still further object is to provide a new and improved article handling device for lifting stacks of bricks, tile and the like off pallets and the like without requiring the lifting of the pallet with the stack thus economizing on the number of pallets and minimizing the number of pallets required by a brick manufacturer, supplier and the like.

Additional objects and advantages of the invention will be readily apparent from the reading of the following description of a device constructed in accordance with the invention, and reference to the accompanying drawings thereof, wherein:

FIGURE 1 is a perspective view of an article handling device embodying the invention;

FIGURE 2 is a side view of the device showing it telescoped about a stack of bricks on a pallet prior to the lifting of the stack thereby;

FIGURE 4 is a perspective fragmentary view of a modified form of the device.

Figure 3:
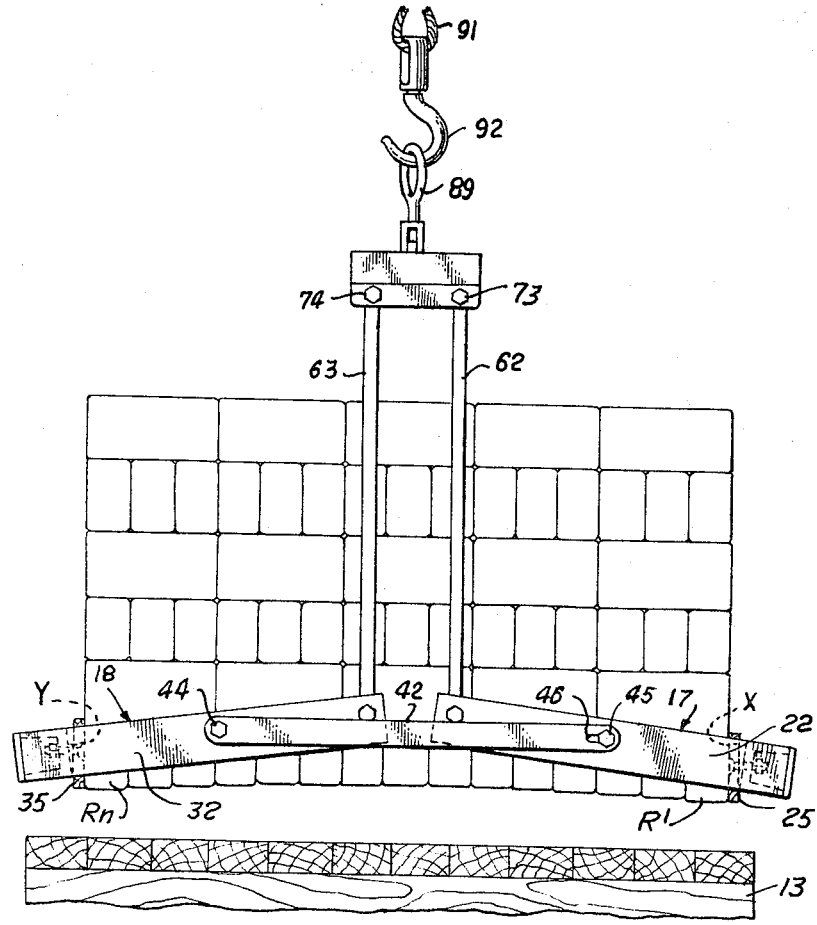
FIGURE 3 is a view similar to FIGURE 2 showing the device lifting the stack.

Referring now particularly to FIGURES 1, 2, and 3 of the drawings, the handling device 10 embodying the invention is particularly adapted for handling a stack 11 of bricks, concrete, tile and the like 12, which are usually stacked on wooden pallets 13 for transport by means of trucks and the like from one location to another. The stack of bricks may include a plurality of layers L1–L$n$, each of the layers comprising a plurality of rows R1–R$n$ of the bricks. The bricks of each layer preferably extend perpendicularly relative to the bricks of adjacent layers.

The handling device 10 includes a pair of complementary gripping members 17 and 18. The gripping member 17 is formed of a pair of parallel side channel members 19 and 20 and a transverse connector channel member 21, which extends between the side members and is rigidly secured thereto in any suitable manner, as by welding. A pair of bars 22 and 23 are rigidly secured by welding to the flanges of the channel members 19 and 20, respectively, and a bar 24 is similarly secured to the flanges of the connector channel member 21 and the outer ends of the side channel members. A somewhat compressible friction member 25, such as a wood board, is loosely secured to the connector channel member in any suitable manner, as by bolts 26, which extend through suitable apertures in the friction member and the web of the connector channel member 21 of larger diameter than the bolts to permit some movement of the compressible member relative to the connector channel member, both pivotally and inwardly.

The gripping member 18 is identical in structure to the gripping member 17 having side channel members 29 and 30 and a connector channel member 31 to whose flanges are secured the bars 32, 33, and 34, respectively. The friction member 35 is similarly secured to the connector channel member 31 by bolts 36.

The gripping members 17 and 18 are pivotally connected at opposite sides thereof for limited longitudinal movement toward and away from one another by a pair of pivot and spacer bars 42 and 43. The pivot bar 42 has one end pivotally connected to the side channel member 29 and bar 32 of the gripping member 18 by means of a bolt 44 which extends through a suitable aperture in one end of the pivot and spacer bar 42. The other end of the pivot and spacer bar 42 is slidably and pivotally secured to the side channel member 19 and bar 22 of the gripping member 17 by a bolt 45 which extends through an elongate slot 46 of the pivot and spacer bar. The head of the bolt 45 prevents outward movement of the pivot and spacer bar relative to the gripping member 17.

The pivot and spacer bar 43 is similarly secured at one end to the side channel member 30 and bar 33 by a bolt 48 which extends through a suitable aperture in the pivot and spacer bar 43 while its other end is secured for pivotal and limited longitudinal movement relative to the side channel member 20 and bar 23 by a bolt 49 which extends through an elongate slot 50 in the pivot and spacer bar 43.

Adjacent ends of the side channel members 19 and 29 are connected at one end of a transverse support beam 61 by a pair of suspension members or bars 62 and 63. The suspension member 62 extends downwardly through a slot 64 in the top flange of the channel member 19 and is pivotally secured to the channel member 19 and bar 22 by a bolt or pin 65 which extends through an aperture in the lower end of the suspension member 62. The suspension member 63 similarly extends through a longitudinal slot 67 of the top flange of the channel member 29 and is pivotally secured in a similar manner by a bolt 68

3 which extends through an aperture in the suspension member 63.

The upper ends of the suspension members 62 and 63 extend between the longitudinally extending straps 70 and 71 dependent from and welded to a plate 72 which is rigidly secured by welding to one end of the beam 61. The upper ends of the bars are pivotally secured to the straps 70 and 71 by means of bolts 73 and 74 which extend through aligned apertures in the straps and in the upper ends of the suspension members 62 and 63, respectively.

The side channel members 20 and 30 similarly are secured to the other end of the beam 61 by means of suspension members or bars 74 and 75 whose lower ends extend through the longitudinal slots 75a and 76 in the top flanges of the side channel members 20 and 30, respectively, and are pivotally secured to these channel members by means of pivot bolts 77 and 78, respectively. The top ends of the suspension members 74 and 75 extend between the straps 79 and 80 dependent from and rigidly secured to the plate 82 which is rigidly secured to the other end of the beam 61 by welding and are pivotally secured to these straps by means of bolts 84 and 85 which extend through aligned apertures in the suspension members and the straps. A hanger bracket 88 is mounted on the beam 61 and is provided with an eye bolt 89.

In use, when it is desired to lift a stack of bricks or the like off the pallet 13, the handling device is moved downwardly over the stack of bricks. The pin and slot connections of the spacer and pivot bars 42 and 43 with the gripping member 17 permit the gripping members 17 and 18 to be moved apart to facilitate this positioning of the gripping members about the stack. The side channel members of the gripping members are spaced farther apart than the width of the stack of bricks so that only the friction members 25 and 35 will engage the outermost end rows R1 and Rn of the bottom layer L1 of bricks. A suitable hoisting mechanism having a cable 91 and a hook 92 is then moved to position the hook within the eye 89 and as the beam 61 is lifted thereby, the inner ends of the two gripping members are pivoted upwardly and away from one another until the pins 45 and 49 prevent this outward movement of the gripping members from one another. As the inner ends of the gripping members are thus pivoted upwardly and outwardly relative to each other from the position illustrated in FIGURE 2 to the position illustrated in FIGURE 3, their outer ends tend to move inwardly toward each other and the friction members 25 and 35 are moved into tight frictional engagement with the outer surfaces of the bricks of the rows R1 and Rn, respectively. The gripping members through the friction members or strips 25 and 35 then exert inwardly and upwardly directed forces on the bricks in the end rows R1 and Rn at locations below the centers of the bricks so that the bricks in the middle rows of the bottom layer actually tend to move upwardly relative to the outermost end rows thereof, this curvature being shown in exaggerated form in FIGURE 3.

The somewhat compressible friction members compress slightly as the inner surfaces X and Y of the connector members 21 and 31, respectively, move from their initial perpendicular positions to their outwardly and upwardly inclined positions illustrated in FIGURE 3 and, by providing a somewhat larger area of force transmittal than would the bottom inner corners of the connector members, prevent damage to the bricks of the end rows.

The pivot and spacer bars 42 and 43 now limit outward movement of the inner portions of the gripping members relative to each other and cause any further movement of the gripping members, due to the upward forces exerted on their inner ends by the suspension members and the load or weight of the bricks, to be a clockwise pivotal movement of the gripping member 17 about the common axis of the bolts 45 and 49 and a counterclockwise pivotal movement of the gripping member 18 about the common axis of the bolts 44 and 48. Any such pivotal movement of the gripping members or any increase in the force tending to pivot them in these directions results in greater upward and inward forces being imposed on the end rows R1 and Rn of the bottom layer of bricks.

It is preferable that the suspension members at each side of the device be substantially perpendicular or diverge slightly upwardly when the handling device is in its initial position illustrated in FIGURE 2 so that substantially vertical upward forces are applied to the inner ends of the side members of the gripping members at the locations of the connections of the suspension members therewith when the beam 61 is raised.

It will now be seen that the articles handling apparatus 10 includes a pair of substantially U-shaped gripping members 17 and 18 each of which has a pair of longitudinally extending side members and outer connector members, that the side members of the gripping members are connected intermediate their ends by pivot and spacer bars, and that the side members are connected adjacent their inner ends to suspension members which are shown as rigid bars 62, 63, 74, and 75 but which could be flexible members such as cables, chains, or the like, if desired.

It will further be seen that when an upward movement is imparted to the suspension means of the device 10, which may include the beam 61 and the suspension members, each frame member is pivoted about the common axis of its pivotal connections with the pivot and spacer bars to cause the connector members of the gripping members to exert inward and upward forces on the object or articles positioned within the gripping members, such as a stack of bricks, so that not only do the gripping members exert inwardly directed forces which tend to compress the articles disposed therebetween but also impart upward forces thereto, it being apparent that if only horizontal inward forces were applied to the end rows of bricks of the bottom layer of the stack, the bricks in the bottom layer would have to be subjected to much greater compressional forces to hold bricks in the middle of the layer from moving downwardly relative to the bricks in the outer rows of the bottom layer due to the loads imposed thereon by the bricks in upper layers of the stack.

It will be apparent that the provision of the slots 46 and 50 in the pivot and spacer bars 42 and 43 is to facilitate the placement of the gripping members about the stack of bricks, the gripping members being held apart to the extent permitted by the slots of the spacer bars during the downward telescoping movement of the gripping members over a stack of bricks and onto the pallet 13. If desired, as illustrated in FIGURE 4, the spacer bars 42 and 43 may be replaced by a spacer bar 100 having an inner section 101 which is pivotally connected by the bolt 49 to the side channel member 20 and bar 23 of the gripping member 17 and a tubular section 102 in which the other section 101 is telescopical. The section 102 is pivotally secured by the bolt 48 to the side channel member 30 and bar 33 of the gripping member 18. It will be apparent, of course, that in this case the bar 42 is also replaced by a pivot and spacer bar 100. The two sections of each pivot and spacer bar are secured to one another in any adjusted telescoped position by a bolt or pin 104 which is insertable through any pair of aligned apertures 105 and 106 provided in the two sections. It will be apparent that when the pivot and spacer bars 100 instead of the pivot and spacer bars 42 and 43 are employed with the gripping members 17 and 18, the two gripping members are initially held in spaced apart position by inserting the bolt 104 through aligned apertures 105 and 106 to hold the locations of the pivotal connections of each pivot and spacer bar with the side channel members a relatively great distance apart. When the handling device has been lowered over a stack of bricks and onto the pallet, the bolts 104 are removed, the two gripping members are moved toward one another and the bolts are then replaced in other sets of apertures of the telescoped sections, the pivot and spacer bars 100 thus being effectively shortened.

It will also be apparent that the forces the two gripping members exert on the bottom layer of bricks varies in accordance with the load or weight of the stack of bricks, the greater being the load, the greater the inward and upward forces exerted on the bricks of the bottom layer of the stack.

Figure 5:
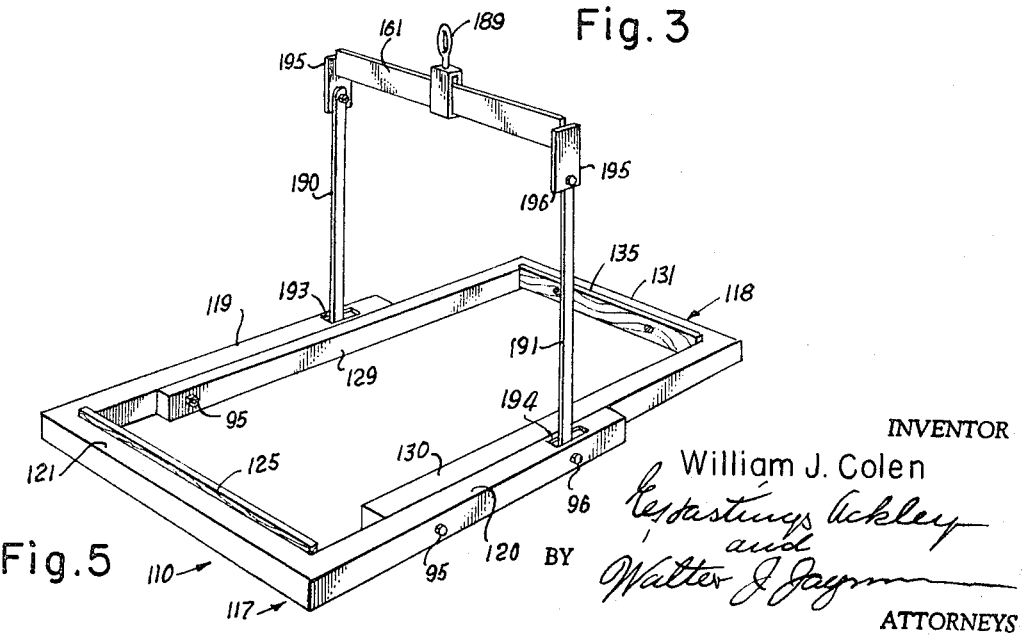
FIGURE 5 is a perspective view of another modified form of the article handling device.

Referring now particularly to FIGURE 5, the article handling device 110 being similar to the device 10, its elements have been provided with the same reference numerals to which the prefix "1" has been added, as the corresponding elements of the device 10. The side members 129 and 130 of the gripping member 118 extend within the side members 119 and 120 of the gripping member 117 and are pivotally connected thereto intermediate the ends of the side members 119 and 120 by means of the bolts 95 and 96. The connector members or sections 121 and 131 of the gripping members 117 and 118 are also provided with the friction members or strips 125 and 135 which may be wood boards. The inner ends of the side members are connected to the beam 161, which is provided with the eye bolt 189 by means of which it may be secured to a hoisting apparatus, by means of suspension members 190 and 191, the suspension members being pivotally secured to the side members 119 and 120 by bolts 193 and to the end plates 195 of the beam by bolts 196.

It will be apparent that when the apparatus 110 is moved into a horizontal position on a pallet, similar to position of the apparatus 10 illustrated in FIGURE 2, and the beam is then raised upwardly, the gripping member 117 is pivoted upwardly about the location of contact of its connector member 121 with the pallet and this upward pivotal movement of the gripping member 117 also then causes upward pivotal movement of the connector member 131 of the gripping member 118 so that the friction strips 125 and 135 move into engagement with bricks of the outermost end rows of the bottom layer of the stack and that due to this pivotal movement of the two frame members and the tilting of their connector members 121 and 131, upward and inward forces are imparted to the end rows of the bricks of the bottom layer in substantially the same manner as in the case of the article handling apparatus 10. The article handling device 10 is preferred, however, since it can be more easily manipulated and more uniformly distributes the forces to both end rows of bricks of the bottom layer of the stack.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An article handling device for lifting a stack of rectangular articles arranged in horizontal layers, each layer comprising at least one horizontal row of the articles, said device including: a pair of rigid gripping members each having a pair of rigid parallel spaced side members and a rigid end connector member extending perpendicular to and rigidly secured to outer ends of said side members, said gripping members having their connector members disposed remote from each other for engaging oppositely facing surfaces of articles at opposite ends of a bottom layer of a stack of articles to be raised by said device; first means connecting adjacent side members of said gripping members for causing one of said gripping members to tend to pivot in a counterclockwise direction and the inner ends of its side members to move upwardly about an axis perpendicular to its side members and parallel to its connector member and the other of said gripping members to pivot in a counterclockwise direction and the inner ends of its side members to move upwardly about an axis perpendicular to its side members and parallel to its connector member when an upward force is exerted on the inner ends of the side members of at least one of said gripping members, said axis of at least one of said gripping members being located intermediate and spaced from the ends of its side members, said axes being parallel; and second means connected to the inner ends of the side members of at least one of said gripping members for exerting an upward force thereon at locations spaced inwardly of said axis of said one of said gripping members.

2. The device of claim 1, wherein said connector members have inner facing planar surfaces which lie in vertical planes when said gripping members are in horizontal aligned relationship to each other.

3. The device of claim 2, and compressible friction means disposed inwardly of said connector members for engagement with articles.

4. The device of claim 3, wherein the side members of one of said gripping members extend between the side members of the other of said side members, and said first means pivotally connects adjacent side members of said gripping members for pivotal movement about an axis parallel to said connector members and intermediate the ends of said other of said gripping members, said second means comprising means for lifting said other of said gripping members remote from its connector member.

5. The article handling device of claim 1, wherein said side members of said gripping members are in longitudinally alignment and said first means comprises a pair of bars pivotally connected at opposite ends to aligned side members of said gripping members.

6. The article handling device of claim 5, wherein said connector members have inner facing planar surfaces which lie in vertical planes when said gripping members are in horizontal aligned relationship to each other.

7. The article handling device of claim 6, and compressible friction means disposed inwardly of said connector members for engagement with articles.

8. The article handling device of claim 7, wherein said bars are connected to the side members of one of said gripping members by means permitting limited longitudinal movement of said one of said gripping members relative to said bars.

9. The article handling device of claim 7, wherein said bars are each formed of two sections adjustably connectable to one another to permit adjustment of the distance between the locations of pivotal connections of the bars with the gripping members.

10. The article handling device of claim 7, wherein each of said bars comprises two sections pivotally connected at their remote ends to adjacent side members of said gripping members, and means for connecting said sections to one another at a plurality of longitudinally spaced locations whereby the lengths of said bars may be adjusted.

11. The article handling device of claim 10, wherein said second means includes means pivotally connected to said side members of said gripping members remote from said connector members and between the locations of pivotal connections of said bars with said side members for exerting upward forces thereon.

12. The article handling device of claim 5, wherein said second means includes means pivotally connected to said side members of said gripping members remote from said connector members and between the locations of pivotal connections of said bars with said side members for exerting upward forces thereon.

13. The article handling device of claim 7, wherein said second means includes means pivotally connected to said side members of said gripping members remote from said connector members and between the locations of pivotal connections of said bars with said side members for exerting upward forces thereon.

14. The article handling device of claim 9, wherein said second means includes means pivotally connected to said side members of said gripping members remote from said connector members and between the locations of pivotal connections of said bars with said side members for exerting upward forces thereon.

15. An article handling device including: a pair of rigid gripping members each having a pair of rigid parallel side members and a rigid connector member extending perpendicular to and secured to outer ends of said side members, said gripping members having their connector members disposed remote from each other; first means connecting adjacent side members of said gripping members for causing one of said gripping members to tend to pivot in a clockwise direction and inner ends of its side members to move upwardly about an axis parallel to its connector member and the other of said gripping members to pivot in a counterclockwise direction about an axis parallel to its connector member and the inner ends of its side members to move upwardly when an upward force is exerted on the inner ends of at least one of said gripping members, said axis of at least one of said gripping members being located intermediate the ends of its side members, said axes being parallel, and second means connected to the inner ends of the side members of at least one of said gripping members for exerting an upward force thereon.

16. The device of claim 15, and compressible friction means disposed inwardly of said connector members for engagement with an object disposed between said connector members.

17. The device of claim 16, wherein the side members of one of said gripping members extend between the side members of the other of said side members and said first means pivotally connects the adjacent side members of said gripping members for pivotal movement about an axis parallel to said connector members and intermediate the ends of said other of said gripping members, and said second means includes means connected to said side members of said other of said gripping members remote from its connector member for lifting said device.

18. The article handling device of claim 16, wherein said side members of said gripping members are in longitudinal alignment and said first means comprises a pair of bars pivotally connected at their opposite ends to aligned side members of said gripping members.

19. The article handling device of claim 18, wherein said second means includes means pivotally connected to said side members of said gripping members remote from said connector members and between the locations of pivotal connection of said bars with said side members for lifting said device.

References Cited

UNITED STATES PATENTS

| | | | |
|---|---|---|---|
| 1,010,501 | 12/1911 | Jones | 294—63 |
| 1,533,934 | 4/1925 | Lutz | 294—62 |
| 1,886,614 | 11/1932 | Wolkow | 294—67.2 |
| 2,775,476 | 12/1956 | Brown | 294—63 |
| 2,789,857 | 4/1957 | Kesselak et al. | 294—62 |
| 3,278,055 | 10/1966 | Stoltz | 294—67.2 |

FOREIGN PATENTS 88,696  12/1956  Norway.

ANDRES H. NIELSEN, *Primary Examiner.*

U.S. Cl. X.R.

294—62